United States Patent [19]

Howell

[11] 3,857,069

[45] Dec. 24, 1974

[54] GROUND FAULT CIRCUIT INTERRUPTER AND MODULE THEREFOR

[75] Inventor: Edward Keith Howell, Simsbury, Conn.

[73] Assignee: General Electric Company, New York, N.Y.

[22] Filed: Dec. 20, 1973

[21] Appl. No.: 426,496

[52] U.S. Cl. ............ 317/18 D, 317/27 R, 317/33 R
[51] Int. Cl. ............................................. H02h 3/28
[58] Field of Search ............... 317/18 D, 27 R, 33 R

[56] References Cited
UNITED STATES PATENTS
3,611,035  10/1971  Douglas ............................ 317/18 D
3,786,356  1/1974  Macphee ......................... 317/18 D
3,800,189  3/1974  Montz ............................... 317/18 D Primary Examiner—James D. Trammell
Attorney, Agent, or Firm—Robert A. Cahill; Philip L. Schlamp; Frank L. Neuhauser

[57] ABSTRACT

A ground fault circuit interrupter (GFCI) utilizes this oscillator operating to induce a first signal in a ground faulted neutral conductor to also inject into the differential current transformer a second signal of opposite polarity to the first. Circuit interruption is initiated when the periodically monitored transformer secondary output voltage is zero or different from zero in a predetermined polarity, indicating either a ground fault on one of the line and neutral conductors or a failure of either the current transformer, the auxiliary transformer, or the oscillator itself, thus providing a measure of fail-safe protection.

15 Claims, 10 Drawing Figures

GROUND FAULT CIRCUIT INTERRUPTER AND MODULE THEREFOR

BACKGROUND OF THE INVENTION

Ground Fault Circuit Interruption (GFCI) OR so-called "people protection" has become a very active industry. GFCI devices are designed to abruptly initiate circuit interruption in the event of a ground leakage current of 5 milliamps or more, such as may flow through a human body coming in contact with the hot or line side of a load circuit. Numerous states are currently mandating for new construction the installation of GFCI devices in certain potentially hazardous residential circuits, such as kitchen appliance circuits and, most especially, circuits including outdoor receptacles for supplying swimming pool equipment, electrical yard tools, and the like.

GFCI devices currently available utilize a differential current transformer inductively coupled with the line and neutral conductors of the protected circuit and having a secondary winding for developing an output voltage proportional to the instantaneous difference in the current magnitudes flowing in the two conductors. That is, under normal circumstances, all the current flowing to the connected load returns to the source and the respective current magnitudes in the two conductors are equal, resulting in a zero secondary output voltage. However, if the line conductor experiences a relatively high impedance ground fault, such as constituted by the human body coming in contact therewith, a portion of the current returns to the source via an external ground circuit rather than the neutral conductor. If this ground fault current, as sensed indirectly by the differential current transformer, exceeds a predetermined threshold, e.g., 5 milliamps, the GFCI device is designed to initiate circuit interruption.

Underwriters Laboratories has required that GFCI devices preserve the five milliampere ground leakage current sensitivity level with the existence of a low impedance ground fault on the neutral conductor which could have a densitizing effect on their operation. That is, if ground faults existed simultaneously on both the line and neutral conductors, a portion of the leakage current from the line ground fault could return to the source via the neutral ground fault and neutral conductor with the result that the differential current transformer will not sense the true magnitude of the line-to-ground leakage current. This condition could result in the flow of hazardous magnitudes of ground leakage current before the differential current transformer would see a sufficient current differential to initiate circuit interruption.

To prevent this de-sensitization from occurring, current GFCI devices further include an internal current source connected to drive the primary winding of an auxiliary transformer whose secondary winding is included in series with the neutral conductor. As long as the neutral conductor, which is grounded at the source, is not grounded on the load side of the GFCI device, the secondary circuit of this auxiliary transformer is open. However, in the event the secondary circuit of the auxiliary transformer is completed through a low impedance ground fault of 4 ohms or less, the internal current source induces a currernt signal in the neutral conductor of sufficient magnitude to create the requisite current differential in the current transformer to initiate circuit interruption. Examples of GFCI devices concerned with ground faulted neutral detection are disclosed in U.S. Pat. Nos. 3,473,091, 3,506,906 and 3,611,035.

In order to simplify the installation of GFCI devices, they are currently being manufactured in sizes comparable to that of conventional circuit protective devices, i.e., circuit breakers. As a consequence, the GFCI functioning components, packaged in a so-called "module," must be of relatively small size and densely packed in order to meet this dimensional requirement. This size problem is further magnified by the fact that GFCI devices must, like conventional circuit breakers, include a thermal-magnetic trip mechanism so as to also provide overload and short-circuit protection. The component size constraints are more severe when it comes to the differential current transformer and the auxiliary transformer in the GFCI module. The physical size of both of these transformers must necessarily be quite small, necessitating the use of a large number of turns of very small, fragile wire, and the core must be formed of special, close-toleranced material. Accordingly, these transformers are susceptible to failure by open circuiting (wire breakage), short-circuiting (insulation failure), or by variations in the core material characteristics. Furthermore, if a separate high frequency oscillator is used to drive the auxiliary trnsformer it is subject to component failure and external influences that affect the criteria for oscillation such that an improper signal or no signal at all is available for detecting a ground faulted neutral condition. Any one of these failures results in a GFCI device incapable of affording the protection for which it is intended.

Currently available GFCI devices are generally equipped with the facility to test for the proper functioning of the current transformer and the secondary signal processor by simultaning a line-to-ground leakage current in excess of the predetermined threshold. This test capability does not, however, cover the ground faulted neutral sensing components. Consequently, the user is left unaware that his GFCI unit, due to failure of the oscillator and/or auxiliary transformer, has become densensitized. Moreover, in currently available GFCI devices, component failure can occur at any time without warning to the user, thus creating a false sense of security which is potentially more hazardous than if the GFCI device was not installed in the first place.

It is accordingly an object of the present invention to provide an improved ground fault circuit interrupter.

Another object of the present invention is to provide a ground fault circuit interrupter of the above character operable to signal various component failures rendering the device incapable of providing the protection for which it is intended.

A further object of the present invention is to provide a ground fault circuit interrupter of the above character which is operable to initiate circuit interruption in the event of a ground fault on either of the line or neutral conductors or various component failures rendering the device incapable of detecting such line or neutral conductor ground faults.

Still another object of the present invention is to provide a ground fault circuit interrupter of the above character which is compact, reliable in operation and relatively inexpensive to manufacture.

Other objects of the invention will in part be obvious and in part appear hereinafter.

SUMMARY OF THE INVENTION

In accordance with the present invention, there is provided an improved ground fault circuit interrupter having the capability of not only signaling the existence of a ground fault on either the line or neutral conductors of a protected circuit, but also capable of signaling the existence of various component failures which would render the device incapable of accomplishing its intended purpose. More specifically, the ground fault circuit interrupter of the present invention includes a differential current transformer for sensing imbalances in the current going to the load and the current returning from the load to the source and a signal source including an auxiliary transformer for inducing a first signal on the neutral conductor of sufficient magnitude to imbalance the differential current transformer in the event of a de-sensitizing ground fault on the neutral conductor. The signal source, in accordance with the present invention, is additionally utilized to inject a second signal into the differential current transformer which is of opposite polarity to the first signal induced on the neutral conductor in the event of a de-sensitizing ground fault thereon. In the event of a de-sensitizing neutral conductor ground fault of a predetermined low impedance (e.g., 4 ohms), the first and second signals counter-balance each other in the differential current transformer, such that the secondary output thereof is essentially zero.

Processing circuitry connected to the differential transformer secondary is keyed in synchronism with the signal source to sample the secondary output signal periodically in order to derive sufficient information to determine not only the existence of a ground fault on either of the line and neutral conductors, but also a failure of either the differential current transformer or the signal source. Should any one of these conditions be found to exist, the signal processing circuitry operates to initiate circuit interruption, thus providing an improved ground fault circuit interrupter having fail-safe operating characteristics.

The invention accordingly comprises the features of construction, combination of elements and arrangement of parts, which will be examplified in the construction hereinafter set forth, and the scope of the invention will be indicated in the claims.

For a fuller understanding of the nature and objects of the invention, reference should be had to the following detailed description taken in connection with the accompanying drawings, in which.

Corresponding reference numerals refer to like parts of the several views of the drawings.

DETAILED DESCRIPTION

Figure 1:
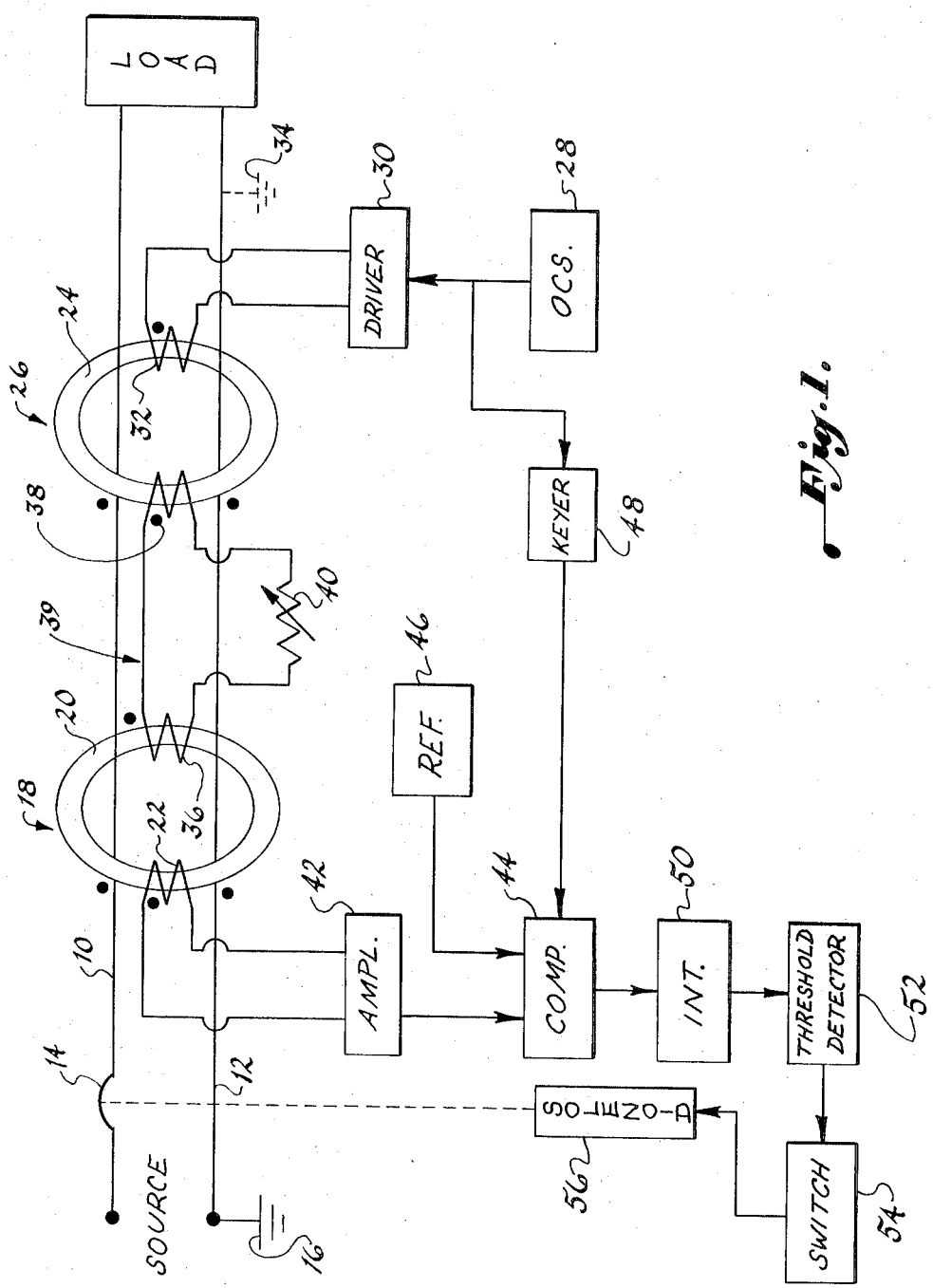
FIG. 1 is a schematic diagram, partially in block form, of an improved circuit interrupter constructed according to an embodiment of the present invention.

The improved ground fault circuit interrupter of the present invention is illustrated in FIG. 1 in its application of providing human shock protection with respect to a distribution circuit having a line conductor 10 and a neutral conductor 12 connected to supply electrical power from an AC source to one or more electrical loads. Interrupter contacts 14 are provided to open the line side of this distribution circuit, and the neutral side is grounded, as indicated at 16, at or near the source in accordance with conventional wiring practice.

A differential current transformer, generally indicated at 18, comprises a toroidal core 20 through which the line and neutral conductors pass to form primary windings of at least one turn. These two primary windings are so wound that the fluxes induced in core 20 in response to normal load currents flowing in the line and neutral conductors are oppositely directed and, under normal conditions, completely cancel each other. Differential transformer 18 further includes a multi-turn secondary winding 22 in which is developed an output signal voltage proportional to the net flux in core 20.

The line and neutral conductors are also passed through the toroidal core 24 of an auxiliary transformer, generally indicated at 26, to serve as secondary windings of at least one turn. These primary windings are similarly wound such that the net flux in core 24 resulting from the currents flowing to and from the load is zero. A current source, such as pulse generator or oscillator 28, feeds a conventional driver circuit 30 connected to drive a multi-turn primary winding 32 wound on core 24 of auxiliary transformer 26. Under normal conditions, the line and neutral conductors constitute separate, open circuited secondary circuits and, as a consequence, the flux flowing in core 24 of auxiliary transformer 26 as the result of current flowing in primary winding 32 is incapable of producing current flow in either the line or neutral conductors. However, if the neutral conducor becomes grounded on the load side of the ground fault circuit interrupter, as indicated at 34, or if the line conductor becomes shorted to another energized line conductor (not shown), the corresponding secondary circuit of auxiliary transformer 26 becomes close-circuited, and current flow is produced in the faulted conductor acting to create a sensible current imbalance in differential current transformer 18.

The description thus far is representative of conventional ground fault circuit interrupters, such as disclosed in the above-noted U.S. Pat. No. 3,611,035.

In accordance with the present invention, the differential current transformer 18 includes a third primary winding 36 and the auxiliary transformer 24 includes a third secondary winding 38. These additional windings are connected with a variable resistor 40, in a loop circuit, generally indicated at 39. The winding sense of these two additional transformer windings is such that the flux produced in core 20 by current flow in this loop circuit opposes the flux produced therein by current flow in the line or neutral conductors originated by oscillator 28. The resistance of resistor 40 is adjusted such that these fluxes substantialy cancel each other in the event the neutral conductor experiences a low impedance ground fault (e.g., 4 ohms) on the load side of the ground fault circuit interrupter, as indicated at 34.

Still referring to FIG. 1, the output voltage induced in secondary winding 22 of differential current transformer 18 is amplified by an amplifier 42 and supplied as one input to a comparator 44. A reference signal voltage derived from a source, indicated at 46, is supplied as a second input to comparator 44. The oscillator output further drives a keyer 48 which operates to develop synchronized gating pulses keying comparator 44 to periodically compare its two inputs. While keyed or gated on by keyer 48, comparator 44 develops an analog current signal proportional to the difference between its inputs in a predetermined sense which are accumulated in an integrator 50. If the integration of these current signals achieves a predetermined threshold level, a threshold detector 52 triggers a switch 54 to close an energizing circuit for a solenoid 56 mechanically linked to open the interrupter contacts 14, thus interrupting current flow to the load.

As will be seen from the description to follow, the circuitry for processing the differential current transformer output signal is effective to initiate the opening of interrupter contacts 14 in the event of a ground fault on either of the line and neutral conductors, or a failure of any one of the differential current transformer, the auxiliary transformer and the oscillator. This is achieved by structuring the comparator 44 to supply a current output to integrator 50 during each keying interval if the differential current transformer output signal voltage is (1) zero, (2) different from zero in a predetermined polarity, or (3) upon cessation of regular keying or gating pulses from keyer 48 evidencing a failure of oscillator 28.

Figure 2:
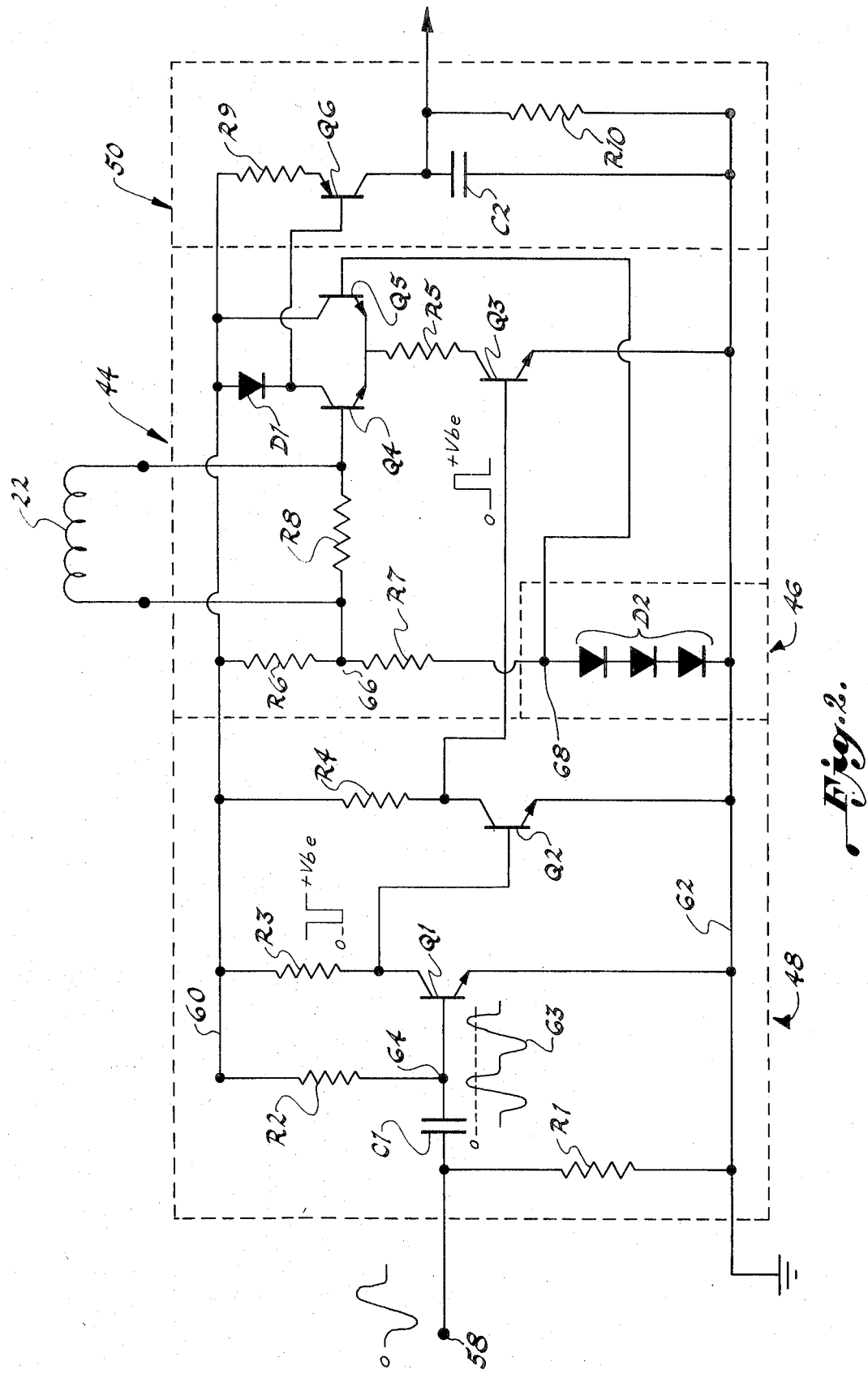
FIG. 2 is a detailed circuit schematic diagram of portion of FIG. 1.
Figure 3:
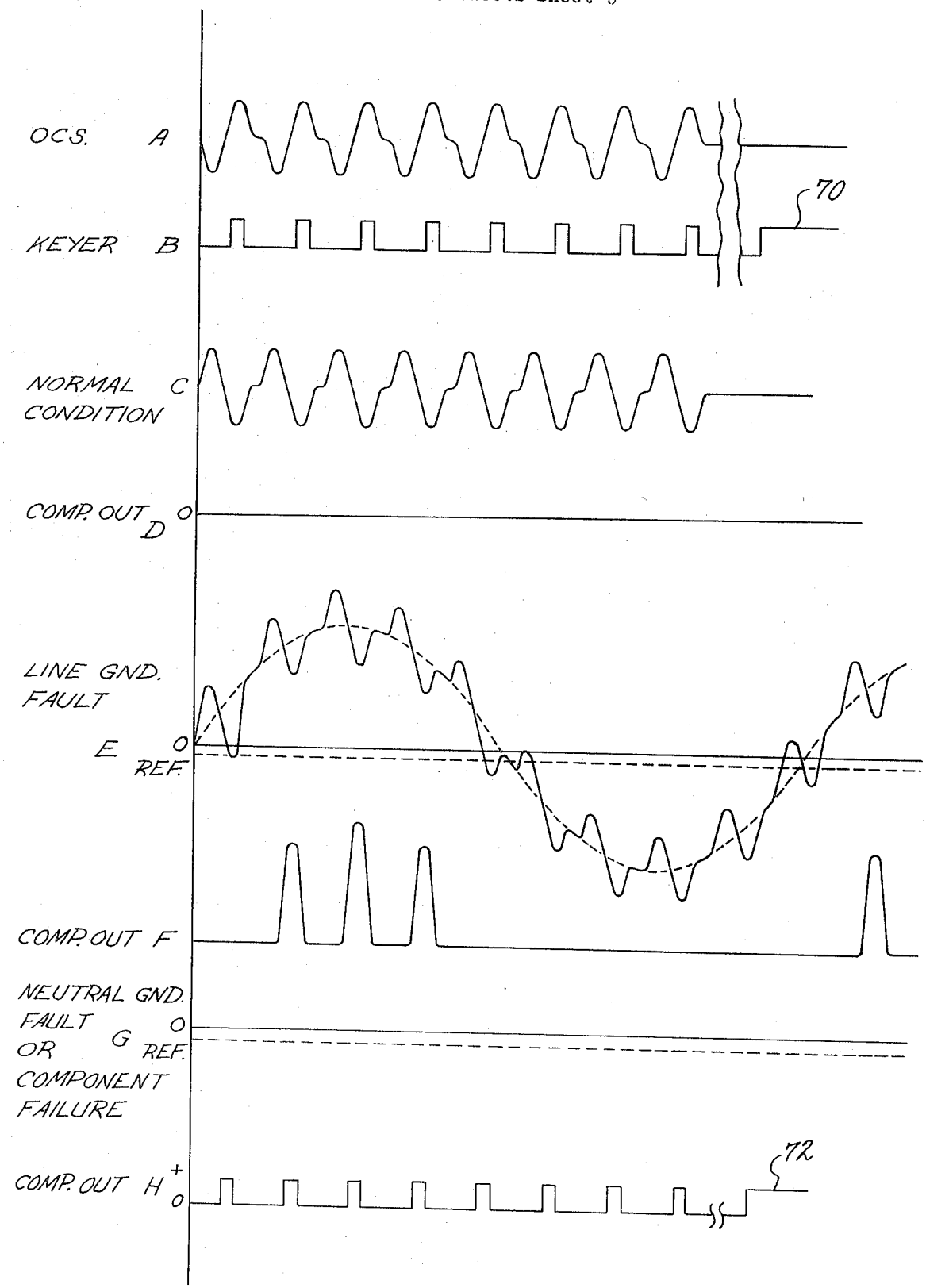
FIGS. 3A through 3H are a series of signal diagrams illustrative of the operation of the fail-safe ground fault circuit interrupter of FIG. 1.

Turning now to FIGS. 2 and 3, it will be assumed for purposes of the present description that oscillator 24 generates a train of pulses such as illustrated in FIG. 3A, wherein each pulse consists of a negative peak followed immediately by a positive peak. It will be appreciated that the specific circuitry disclosed in FIG. 2 may be modified to handle a variety of pulse waveforms without departing from the scope of the instant invention. The oscillator frequency is intended to be greater than 60 Hertz, but again the specific relationship of the oscillator frequency to the line frequency is not deemed to be material to the present invention. As seen in FIG. 2, this oscillator pulse output is supplied to input terminal 58 of keyer 48 which is connected to ground through a resistor R1 and coupled to the base of a transistor Q1 by a capacitor C1. The base and collector of transistor Q1 are connected to a positive supply voltage bus 60 through resistors R2 and R3, respectively, while its emitter is connected directly to a ground bus 62. The collector of transistor Q1 is directly connected to the base of a transistor Q2, whose emitter is grounded and collector is connected to bus 60 through a resistor R4. The output from keyer 48 is taken from the junction between resistor R4 and the collector of transistor Q2.

By virtue of the diode action of the base-emitter junction of transistor Q1, the positive peaks of the oscillator pulse train are clamped to a positive voltage of approximately 0.6 volts which has the effect of inserting a negative DC voltage component into the oscillator pulse train (indicated at 63) as it appears at a junction 62 between capacitor C1 in the base of transistor Q1. During the positive peaks of the pulse train appearing at junction 62, transistor Q1 is turned on, and the voltage at its collector goes from +V$be$, the saturated base voltage of transistor Q2, to ground, thereby turning off transistor Q2. The voltage at the collector of transistor Q2 goes from ground potential to +V$be$, the saturated base voltage of transistor Q3. Upon the passage of the positive peak of each oscillator pulse, transistor Q1 is turned off, and transistor Q2 is turned on. It is thus seen that each positive peak of the oscillator pulse train produces a negative going pulse at the collector of transistor Q1, which is inverted to a positive going pulse at the collector of transistor Q2, which constitutes the output keyer 48 as illustrated in FIG. 3B.

As long as the oscillator pulses are forthcoming, the average voltage at junction 62 remains at substantially the negative DC component level. During the interval between pulses, the voltage at junction 62 rises gradually from this negative DC voltage level as capacitor C1 is charged through resistor R2 from bus 60. If oscillator 28 malfunctions or fails such that the oscillator pulses are no longer forthcoming, this charging of capacitor C1 continues unabated, and when the voltage at junction 62 reaches approximately +0.6 volts, transistor Q1 is turned on and transistor Q2 is turned off, with the result that the keyer output assumes a continuing positive voltage level.

The keyer output at the collector of transistor Q2 is connected to the base of transistor Q3 included in comparator 44. The emitter of transistor Q3 is connected to the ground bus 62 and its collector is connected to the positive supply bus 60 through a diode D1, while the collector of transistor Q5 is directly connected to the positive supply bus. A voltage divider network consisting of resistor R6, resistor R7 and a series string of three diodes D2 is connected between positive supply bus 60 and ground bus 62. The base of transistor Q4 is referenced to the junction 66 between resistors R6 and R7 through a resistor R8. The base of transistor Q5 is connected to the junction 68 between resistor R7 and the diode string D2, which serves as the reference signal source 46 in FIG. 1. The differential current transformer secondary winding 22 is connected across resistor R8 such that the transformer output signal supplied to comparator 44 is superimposed on the voltage at junction 66 which is more positive by the voltage drop across resistor R7 than the reference voltage at junction 68 supplied as the other input to comparator 44.

It is seen from the circuit schematic of FIG. 2 that each keying or gating pulse from keyer 48 (Fig. 3B) turns transistor Q3 on to complete the circuit to ground for the emitters of transistors Q4 and Q5. While transistor Q3 is rendered conductive, comparator 44 is thus rendered operative to compare the signal voltage induced in the differential current transformer secondary winding 22 with the reference signal voltage at junction 68. The parameters of the comparator circuitry are selected such that, in the absence of an induced signal voltage in transformer secondary winding 22, the voltage at junction 66, as referenced to the base of transistor Q4 through resistor R8, is sufficiently more positive than the voltage on its emitter, as imposed by the conduction of transistor Q5, as to render transistor Q4 conductive. As a consequence, current is drawn through diode D1 sufficient to turn on a transistor Q6 in the integrator circuit 50. While conducting, current is drawn through a resistor R9 and the emitter-collector circuit of transistor Q6 to charge a capacitor C2. In the interval between transistor Q6 conductions, capacitor C2 discharges through a resistor R10. If the charge on capacitor C2 builds up to the point where the voltage developed thereacross exceeds a predetermined threshold level determined by threshold detector 52 (FIG.1), which may take the form of the unijunction transistor, a suitable electronic switch 54, such as a silicon controlled rectifier, is triggered to initiate circuit interruption.

Similarly, when the signal voltage induced in the transformer secondary winding 22 is positive during the keying or gating pulse output from keyer 48, transistor Q4 isturned on to draw current through diode D1, thereby turning on transistor Q6 to permit charging of capacitor C2 of integrator 50. On the other hand, if during the keying pulse interval, the transformer secondary signal voltage is sufficiently negative so as to depress the voltage at the base of transistor Q4 below the level necessary to bias transistor Q4 on, no current is drawn through diode D1, transistor Q6 remains cut off, and no charge is accumulated on capacitor C2.

The overall operation of the ground fault circuit interrupter of FIG. 1 will now be considered in conjunction with FIG. 3. FIG. 3A, as previously noted, illustrates the pulse train supplied by oscillator 28 to driver 30 (FIG. 1) and to input terminal 58 of keyer 48 FIG. 2). FIG. 3B illustrates the comparator enabling keyer output pulses generated in response to each positive peak of the oscillator output pulse train for application to the base of transistor Q3. As previously noted, should the oscillator 28 fail, the keyer output, due to the charging of capacitor C1 toward the positive supply voltage +Vcc, assumes a continuing positive voltage level, as indicated at 70 in FIG. 3, to maintain comparator 44 in a keyed or enabled condition.

Under normal conditions, that is, absent a ground fault on either the line or neutral conductors or a component failure, the voltage signal induced in the differential current transformer winding 22 is as shown in FIG. 3C. It will be noted that the oscillator pulse train appearing in the secondary output of transformer 18 is inverted relative to the oscillator pulse train output illustrated in FIG. 3A. This inversion may be effected by appropriate selection of the winding sense of auxiliary transformer secondary winding 38 and differential current transformer primary winding 36. From a comparison of FIGS. 3B and 3C, it is seen that the negative peaks appearing in the differential current transformer output signal under normal conditions are aligned in time with the comparator enabling output pulses generated by keyer 48. As a consequence, comparator 44 is enabled to compare the transformer output signal voltage and the reference signal voltge during each of these negative signal peaks. Under these circumstances, the signal voltage at the base of transistor Q4 is not sufficiently positive relative to the reference voltage at the base of transistor Q5, and the comparator output, illustrated in FIG. 3D, is zero and no charge is accumulated on capacitor C2 of integrator 50 (FIG. 2).

In the event of a line-to-ground fault resulting in a ground leakage current, the differential current transformer output signal voltage is as illustrated in FIG. 3E. It is seen that the resulting current imbalance in the line and neutral conductors produces a net flux in the core 20 of the differential transformer 18 which induces a 60 Hertz difference signal voltage. Superimposed on this 60 Hertz voltage wave is the oscillator pulse train transformer coupled into the differential transformer output via loop circuit 39 (FIG. 1). It is seen that during the positive half-cycle of the 60 Hertz signal, the superimposed oscillator negative peaks coincident with the keying of comparator 44 are considerably more positive than the reference signal voltage, and the comparator is thus conditioned to issue output pulses, illustrated in FIG. 3F, having amplitudes proportional to the signal differential. Charging current proportional to each comparator output pulse amplitude is drawn through transistor Q6 of integrator 50 pursuant to accumulating a charge on capacitor C2.

It is an important feature of the present invention that the comparator output pulses are amplitude modulated in accordance with the magnitude of the ground leakage current, and thus capacitor C2 is charged toward the circuit interruption initiating threshold level at a rate which is directly related to the severity of the line-ground fault.

In the event the neutral conductor 12 experiences a ground fault of 4 ohms, the flux produced in transformer core 20 resulting from the oscillator pulse train being induced on the neutral conductor is completely cancelled out by the flux produced in core 20 by the oscillator pulse train induced in loop circuit 39. As a consequence, the differential current transformer output signal is zero, as is illustrated in FIG. 3G. Inasmuch as the transformer output signal voltage is superimposed on a bias voltage level at junction 66 (FIG. 2) which is more positive than the reference signal voltage, transistor Q4 is rendered conductive during the keying of comparator 44, and the comparator output (FIG. 3H) causes capacitor C2 to be progressively charged to the threshold voltage level pursuant to initiating circuit interruption. If the neutral conductor ground fault impedance is less than 4 ohms, the oscillator pulse train induce on the neutral conductor would predominate, it is seen that the resulting net flux would produce a secondary output signal having a positive voltage during the keying of comparator 44. Consequently, circuit interruption is initiated in the event of a low impedance ground fault on the neutral conductor of 4 ohms or less.

In similar fashion, capacitor C2 is charged to the threshold level on failure of differential current transformer 18 inasmuch as its secondary output voltage would also be zero. Should the auxiliary transformer 26 fail, the differential current transformer output signal voltage would again be zero, and capacitor C2 would be charged to the circuit interrupting threshold level just as though a ground fault existed on the neutral conductor. Finally, should oscillator 28 fail, as has been previously discussed, the transformer output signal voltage goes to zero and the keyer output, once capacitor C1 has charged sufficiently to turn on transistor Q1, assumes a comparator enabling positive signal voltage level (indicated at 70 in FIG. 3B). As a consequence, transistor Q4 in comparator 44 is turned on to produce a continuing positive comparator output voltage (indicated at 72 in FIG. 3H) to turn on transistor Q6, and capacitor C2 is steadily charged to the threshold voltage level.

While the instant disclosure has been specifically directed to the use of a separae oscillator to generate the faulted neutral sensing signal, it will be appreciated that lower sensing signal frequences, such as 60 Hertz (typically the line frequency), may be used. This approach to de-sensitization detection is disclosed in the above-noted U.S. Pat. Nos. 3,473,091 and 3,506,906. To implement the present invention to this approach, auxiliary transformer primary winding 32 (FIG. 1) would merely be connected across the line and neutral conductors through a suitable current limiting impedance.

Keyer 48 would take its input from the line conductor to derive a comparator keying or gating pulse during each negative half-cycle of the differential transformer secondary signal component arising from the current flow in loop circuit 39; this signal component being of opposite polarity to the secondary signal component arising from imbalances in the current flowing in the line and neutral conductors. Under these circumstances, the secondary output voltage would be negative during each sampling interval under normal conditions and the comparator output would be zero. The secondary output voltage would be zero or of a positive polarity during sampling intervals to produce a compartor output in the event of a ground fault on either of the line or neutral conductors, or failure of either of the differential or auxiliary transformers.

It is thus seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim and desire to secure by Letters Patent is:

1. A ground fault circuit interrupter comprising, in combination:
   A. circuit interrupter contacts for connection in the line side of a power distribution circuit including a line conductor and a neutral conductor grounded at the power source;
   B. means for sensing a current imbalance in the line and neutral conductors and developing an output signal proportional to any such current imbalance;
   C. a signal source including an auxiliary transformer for inducing a first signal on the neutral conductor effective to produce a current imbalance sensible by said sensing means in the event of a low impedance neutral conductor ground fault;
   D. means coupling a second signal to said sensing means effective to counteract the imbalancing effect thereon of said first signal; and
   E. signal processing means for processing said output signal such as to initiate circuit interrupting operation of said interrupter contacts when said output signal is substantially zero.

2. The ground fault circuit interrupter of claim 1, wherein said signal processing means further includes means for also initiating circuit interruption when said output signal is different from zero in a predetermined polarity.

3. The ground fault circuit interrupter of claim 2, wherein said sensing means comprises a differential current transformer having first and second primary windings for connection in series with the line and neutral conductors, respectively, and a secondary winding in which said output signal is developed.

4. The ground fault circuit interrupter of claim 3, wherein said coupling means includes a third primary winding of said differential current transformer.

5. The ground fault circuit interrupter of claim 4, wherein said coupling means further includes a secondary winding of said auxiliary transformer connected in loop circuit with said third primary winding of said differential current transformer.

6. The ground fault circuit interrupter defined in claim 2, wherein said signal processing means includes a comparator for comparing said output signal with a predetermined reference signal.

7. The ground fault circuit interrupter of claim 6, which further includes a gating circuit driven in synchronism with said signal source for periodically enabling said comparator to compare said output signal with said reference signal.

8. The ground fault circuit interrupter of claim 7, wherein said signal source further includes a signal generator connected to drive said auxiliary transformer and said gating circuit, said gating circuit including means responsive to a failure of said signal generator for continuously enabling said comparator.

9. The ground fault circuit interrupter defined in claim 6, which further includes:
   A. an integrator connected to integrate the outputs of said comparator; and
   B. a threshold detector operable when the integration of said comparator outputs exceeds a predetermined level to initiate circuit interruption.

10. A module for use in a ground fault circuit interrupter to provide fail-safe operation, said module comprising, in combination:
    A. means for sensing a current imbalance in the line and neutral conductors of a distribution circuit, the neutral conductor being grounded at the power source, said sensing means developing an output signal proportional to any such current imbalance;
    B. signal source including an auxiliary transformer for inducing a first signal on the neutral conductor effective to produce a current imbalance sensible by said sensing means in the event of a low impedance neutral conductor ground fault;
    C. means coupling a second signal to said sensing means effective to counteract the imbalancing effect thereon of said first signal; and
    D. signal processing means for processing said output signal such as to initiate circuit interruption when said output signal is substantially zero or different from zero in a predetermined polarity.

11. The module defined in claim 10, wherein said sensing means comprises a differential current transformer having first and second primary windings for connection in series with the line and neutral conductors, respectively, and a secondary winding in which said output signal is developed.

12. The module defined in claim 11, wherein said coupling means includes a third primary winding on said differential current transformer and a secondary winding of said auxiliary transformer connected in loop circuit.

13. The module defined in claim 12, wherein said signal processing means includes a comparator for comparing said output signal with a predetermined reference signal, and said module further includes a gating circuit synchronized with said signal source for periodically enabling said comparator to compare said output signal with said reference signal pursuant to developing a comparator output capable of initiating circuit interruption.

14. The module defined in claim 13, wherein said comparator includes means for referencing the voltage of said output signal to a fixed voltage which exceeds the voltage of said reference signal in said predetermined polarity.

15. The module defined in claim 13, wherein said signal source further includes a signal generator connected to drive said auxiliary transformer and said gating circuit, said gating circuit including means for continuously enabling said comparator in the event of a failure of said signal generator, thereby to develop a continuing comparator output for initiating circuit interruption.

* * * * *